(No Model.)
C. VON RIESEN.
EXPANSIBLE PULLEY.
No. 535,034.          Patented Mar. 5, 1895.
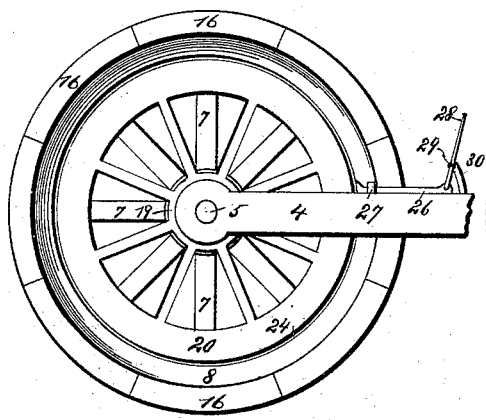
Fig. 1.
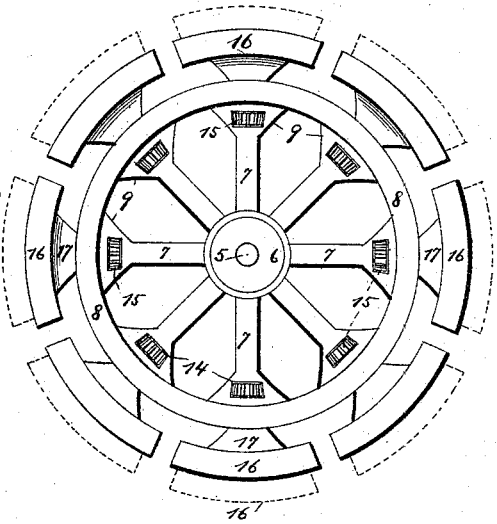
Fig. 2.
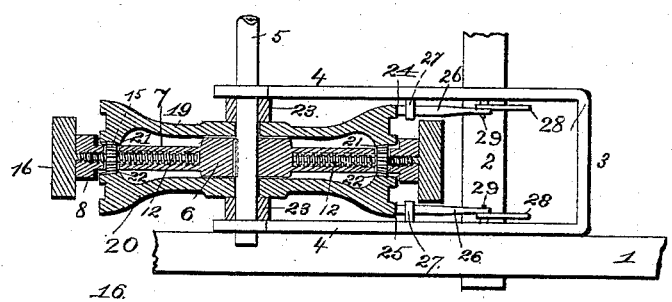
Fig. 3.
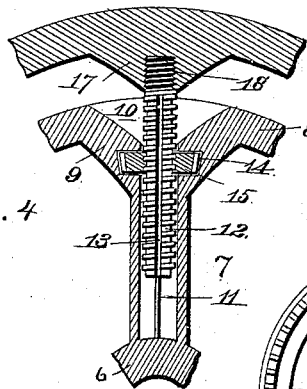
Fig. 4.
Fig. 5.
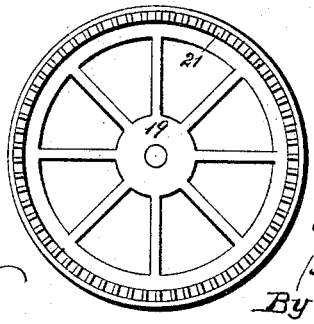
Fig. 8.
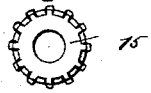
Fig. 6.
Fig. 7.
Witnesses:
F. G. Fischer
[signature]
Inventor:
C. von Riesen,
By [signature]
Attys.
THE NORRIS PETERS CO., PHOTO-LITHO., WASHINGTON, D. C.

UNITED STATES PATENT OFFICE.

CORNELIUS VON RIESEN, OF BEATRICE, NEBRASKA.

EXPANSIBLE PULLEY.

SPECIFICATION forming part of Letters Patent No. 535,034, dated March 5, 1895.

Application filed July 16, 1894. Serial No. 517,690. (No model.)

*To all whom it may concern:*

Be it known that I, CORNELIUS VON RIESEN, of Beatrice, Gage county, Nebraska, have invented certain new and useful Improvements in Expansible Pulleys, of which the following is a full, clear, and exact description, reference being had to the accompanying drawings, forming a part hereof.

My invention relates to pulleys, which may be expanded or contracted diametrically, and the object of the invention is to produce a pulley of this character whereby the operation of the same, through the medium of other mechanism, causes its expansion or contraction.

A further object of the invention is to produce a pulley of this character, which is simple, strong, durable, and inexpensive of construction.

With these objects in view, the invention consists in certain peculiar and novel features of construction and combinations of parts, as hereinafter described and claimed.

In order that the invention may be fully understood, reference is to be had to the accompanying drawings, in which—

Figure 1. is a side elevation of a pulley embodying my invention in its contracted position. Fig. 2. is a side elevation of the same expanded. Fig. 3. is a central horizontal sectional view of Fig. 1, showing the supporting frame in elevation. Fig. 4. is a sectional view enlarged of a portion of the pulley in its expanded position. Fig. 5. represents an edge view of a portion of the circular brace which connects the spokes of the wheel. Figs. 6. and 7. represent plan and sectional views, respectively, of one of the combined pinion and worm wheels employed to expand or contract the pulley, and Fig. 8. is an inner face view of one of the cog wheels for operating the said combined pinion and worm wheels.

In the said drawings, 1 and 2 designate a portion of a suitable supporting framework, and 3 designates a bracket, which is provided with a pair of longitudinal and parallel arms 4, 4, in the free ends of which is journaled a shaft 5. Keyed or otherwise rigidly mounted upon said shaft, and midway between said arms 4, is a wheel 6, having a series of radial and hollow spokes 7, which connect the hub of said wheel with the circular brace 8; said circular brace being arranged concentric to the axis of said wheel. The spokes 7, at their point of junction with the brace 8, are flared outwardly, so as to form the strengthening web 9, and formed in the periphery of the brace 8 are a number of approximately V-shaped cavities or recesses 10, the center of said cavities or recesses being in radial alignment with said spokes, and communicating with the interior thereof. At diametrically opposite points the longitudinal ribs 11 project inwardly from said hollow spokes. A worm-rod 12 engages each hollow spoke, and is provided at opposite sides with longitudinal grooves 13, which engage the longitudinal ribs 11. The web or strengthened portions of said spokes are provided with openings 14, at right angles to the radial direction of their respective spokes, and fitting snugly within said openings, and projecting beyond the sides of said web-portions, are beveled gear pinions 15, which are provided with internal threads, which engage the said worm-rod.

Segmental blocks 16, which form the rim of the wheel, are carried at the outer end of the worm-rods 12, being preferably screwed tightly upon the portion 18 of said worm-rods, and said segmental blocks are each provided with an inwardly projecting and approximately V-shaped web or strengthening portion 17, which are adapted to engage and fit snugly within the corresponding cavities or recesses 10.

From the foregoing it will be apparent that as the gear pinions 15 are turned in one direction the segmental blocks 16 will be moved outwardly, and that when they are turned in the opposite direction the said segmental blocks will be moved inwardly.

Loosely mounted upon the shaft 5, and bearing against opposite sides of the wheel 6, are a pair of similar cog-wheels 19 and 20, and these cog-wheels are held with their teeth 21 and 22, respectively, always engaging the opposite sides of the gear-pinions 15, by means of the collars 23, which are interposed between said cog-wheels and the arms 4, and are mounted upon the shaft 5. Because of the continuous engagement of said cog-wheels 19 and 20 with the gear-pinions 15, they normally rotate with the central wheel 6, and at the same speed. These wheels 19 and 20 are also each formed with a circular shoulder or periphery 24 and 25, respectively, against which the brake-rods 26 are adapted to frictionally engage. These rods are mounted to slide in guides 27, which project inwardly from the arms 4, 4, and are pivotally connected at their rear ends to the lower ends of the levers 28. Said levers are pivotally mounted at 29 upon the arms or brackets 30, carried by the arms 4. (See Fig. 1.)

It is apparent, from this construction, that to expand the belt pulley it is not necessary to stop the machine and take off the belt, as that can easily be accomplished while the machine is in full operation and speed by operating the proper lever 28, and causing the corresponding brake-rod to engage frictionally against the periphery of the corresponding wheel, so that the rotation of the same shall be retarded or entirely arrested. Immediately this takes place, the gear-pinions 15 are caused to slide, and thereby rotate the worm-rods 12 simultaneously outward, and this movement of the worm-rods, of course, increases the diameter of the belt-pulley, and thereby diminishes its peripheral speed of revolution.

To contract the belt-pulley, it is necessary to reverse the operation of the said lever, and thereby retract the advanced brake-rod so that it shall release the said wheel, and to arrest or retard the rotation of the opposite wheel by forcing into frictional engagement therewith the other brake-rod by the operation of its respective lever 28. This operation causes the pinions 15 to rotate in the opposite direction, and cause the simultaneous inward movement of the worm-rods, and therefore lessen the diameter of the wheel and increase the peripheral speed of revolution thereof, as will be understood.

From the above description, it will be apparent that I have produced an expansible pulley which is easily and expeditiously contracted or expanded diametrically, and which is simple, strong, and inexpensive of construction, and may be employed advantageously in connection with various machines, where it is required at times to increase or diminish the speed of travel of the belt.

Having thus described my invention, what I claim as new, and desire to secure by Letters Patent, is—

1. In a belt pulley, the combination with a supporting frame, a rotating shaft journaled therein, a wheel mounted rigidly upon said shaft and provided with hollow radial spokes, and longitudinal guide-ribs projecting inwardly of said hollow spokes, of a circular brace connecting the outer ends of said spokes and provided with cavities in its periphery which register with said spokes and openings at the junction-point of said spokes with the said brace, worm-rods engaging said hollow spokes, and provided with longitudinal grooves engaged by said ribs, and segmental blocks or sections carried at the outer end of said worm-rods, and provided with web portions adapted to engage the cavities of said brace, and wheels internally threaded and fitting in the openings at the junction-point of the spokes with the said brace, and engaging the said worm rods, substantially as set forth.

2. The combination with a supporting framework, a bracket or frame carried thereby, a shaft journaled in said bracket or frame, a wheel keyed upon said shaft and provided with hollow radial spokes, longitudinal ribs projecting inwardly of said hollow spokes, worm-rods carrying segmental blocks or sections at their outer ends and engaging said hollow spokes, and provided with longitudinal grooves engaged by said ribs, and gear-pinions provided with internal threads engaging said worm-rods, of cog-wheels loosely mounted upon the shaft and meshing continuously with the opposite sides of said gear-pinions, brake-rods suitably guided and carried by said frame or bracket, and levers pivotally connected to said brake-rods, so that the same may be forced into or drawn from frictional engagement with the periphery of said cog-wheels, substantially as and for the purpose set forth.

In testimony whereof I affix my signature in presence of two witnesses.

CORNELIUS VON RIESEN.

Witnesses:
C. JANSEN, Jr.,
HENRY WIEBE.